Patented Mar. 24, 1931

1,797,402

UNITED STATES PATENT OFFICE

WILLIAM S. CALCOTT, OF PENNS GROVE, NEW JERSEY, AND HERBERT W. WALKER, OF WILMINGTON, DELAWARE, ASSIGNORS TO E. I. DU PONT DE NEMOURS & COMPANY, OF WILMINGTON, DELAWARE, A CORPORATION OF DELAWARE

NONCORROSIVE WATER AND ALCOHOLIC SOLUTION

No Drawing.     Application filed September 7, 1929. Serial No. 391,105.

This invention relates to the preparation of noncorrosive water and alcohol solutions which are stable at elevated temperatures under air saturated conditions. More particularly it pertains to the use of non-frothing collecting flotation agents as a class of organic compounds which stabilize non-corrosive water and alcohol solutions of the amino carboxylic acids and their derivatives such as the sodium salt of phenylglycine.

This case is an improvement upon the invention of a copending patent application covering non-corrosive water and alcoholic solutions of the amino carboxylic acids and their derivatives. The copending application pertains to the use of carboxylic acids and their water soluble derivatives as inhibitors for iron corrosion by ordinary water and by aqueous solutions of mono- and polyhydric alcohols. In the presence of copper or copper bearing metals, such as brass for example, heated solutions of the sodium salt of phenylglycine are very readily oxidized in contact with air or oxygen, become badly discolored to a dark green and black and there is precipitated a finely divided black oxidation product. The protection against corrosion of iron by the solution is retained, but the blackened color of the solution and precipitation during heat treatment in the presence of copper and air are objectionable because of their unsatisfactory appearance.

This invention has as an object the prevention of oxidation of amino carboxylic acids and their derivatives, such as sodium phenylglycinate, in water and alcohol solutions in the presence of oxygen and metallic oxidation catalysts, such as copper or brass.

A still further object is to so stabilize the solutions containing an amino carboxylic acid derivative, such as the glycinates, so that they will remain essentially colorless, clear and free from suspended or precipitated matter under oxidation conditions at elevated temperatures. Another object is to prevent the corrosion of copper which, aside from the objectionable action of the dissolved copper on the soluble glycine compound, over a considerable period of time would affect the life and usefulness of radiator and storage systems where copper and copper bearing metals were employed.

These objects are accomplished by adding to the amino carboxylic acid derivative, such as the sodium phenyl glycinate solutions, or mixing with the dry glycinate before solution, certain organic compounds which will combine chemically with or be absorbed by metallic copper in such a way as to form over the surface of the free metal an adherent insoluble film. Such a film protects the solution from contact with free metallic copper and renders the copper inert toward the solution and its components. This resultant passive condition of the copper decreases to a negligible degree the undesirable catalytic activity of the metal otherwise taking place if the film-forming stabilizers are not incorporated.

A wide variety of different organic compounds have been found to possess the film-forming, protective property which makes them advantageous for use in connection with our non-corrosive water and alcohol solutions of sodium phenylglycine where copper as alloy or free metal is present. The compounds which we have found to be effective form the general class of substances known as collecting agents in ore flotation work. In general, these collecting agents contain divalent sulfur or trivalent nitrogen or both as they occur in such classes or types of compounds as the thiazoles, xanthates, thioureas, mercaptans, thiocarbamates, thiocyanogens, thio amids, azo and diazo compounds, amines, hydrazines, amino azo compounds and the like.

By way of illustrating our invention, we append the following examples:

Example 1

1% of a mixture composed of sodium phenyl glycinate containing 5% sodium salt of mercaptobenzothiazole dissolved in water, or a 40% ethyl alcohol, glycol or glycerine solution in water forms a solution which effectively inhibits the corrosion ordinarily taking place when iron and copper or ferrous and copper bearing metals are exposed to water itself and to aqueous solutions of these alcohols in the presence of air and further-more which remains clear, non-discolored, and free from precipitated material at elevated temperatures. A water or alcohol solution containing 1% of such a mixture has the composition of 0.95% sodium salt of phenylglycine and 0.05% sodium salt of mercapto benzo thiazole. This solution, after heating for two weeks on a boiling water bath with constant aeration in the presence of iron and copper strips, remained clear, transparent, free from rust or organic sediment and substantially colorless. The metals were unattacked and retained their initial clean, lustrous appearance. Without the sodium mercapto benzo thiazole the phenylglycinate solution became darkened after four hours heating and black in color with precipitation in seven hours.

*Example 2*

Diethanol thiourea was added to a 0.95% water solution of sodium phenylglycinate in sufficient quantity to give 0.05% of the thiourea in the total solution, copper and iron strips added and the resulting solution heated to 85–90° with constant aeration for two days. A control sample containing only the sodium phenylglycine discolored badly after five hours heating while the solution containing the diethanol thiourea in addition remained clear, colorless, and apparently unchanged. The metals were free from any corrosive action.

It will be understood that we do not wish to be limited to the specific compounds, specific solutions, or specific amounts of materials mentioned in the preceding examples which, as stated above, were set forth purely by way of illustrating our invention. We have found that in general substances known to be collecting agents in the flotation of metals function as corrosion inhibitors and as oxidation inhibitors when added to solutions of water or water and alcohols, and that said compounds have a specific action toward iron and copper. By way of simplifying the consideration of the broad classes of compounds falling within the definition of flotation agents, we have grouped the compounds in two main groups, one of which comprises organic substances containing divalent sulphur, and the other organic substances containing trivalent nitrogen and more specifically trivalent nitrogen linked directly to carbon. Within the first group of compounds are such substances as mercaptans and specifically the mercapto benzo thiazoles. Within the second class of compounds are the aromatic azo bodies and the aromatic bases. As illustrative of the compounds falling within the organic divalent sulphur containing class, which we have tested and found to be effective, are mercapto benzo thiazole, sodium mercapto benzo thiazole, mercapto naphthyl thiazole, the alkyl substituted mercapto benzo thiazoles and sodium salts thereof, sodium iso propyl xanthate, potassium xanthate, sodium dimethyl dithio carbonate, sodium ethyl trithio carbonate, benzyl mercaptan, thio cresol, di-iso amyl thiourea, diethanol thiourea, thio formaldehyde, thio carbanilide, phenyl thio urethane.

As illustrative of the aromatic azo bodies which comprise one class of the group of trivalent nitrogen-containing substances, which we have tested and found to be effective, are azo benzene, amino azo toluene, amino azo toluene azo naphthol.

As illustrative of the aromatic bases which comprise another class of the trivalent nitrogen containing substances, which we have tested and found to be effective, are benzidine, phenyl hydrazine, orthotoluidine, triphenyl guanidine, quinoline, pyridine, azoxy benzene, and a-naphthylamine.

Each of the compounds listed above has been demonstrated to contribute to the stability of and prevention of discoloration and precipitation otherwise noticeable in water and alcohol solutions of amino carboxylic acid derivatives, such as sodium phenyl glycine. Those compounds which are normally considered as more or less insoluble in water do, however, dissolve in hot 1% sodium phenyl glycinate water solutions to a sufficient extent to function in accordance with our invention.

We do not wish to be limited to the use of the agents listed above with sodium phenyl glycine. The inhibitors are effective in preventing corrosion of iron and copper when used in solutions containing other amino carboxylic acids and other water soluble derivatives of amino carboxylic acids. As examples of other amino acid derivatives are anthranilic acid and the sodium and potassium salts of anthranilic acid, as well as water-soluble organic derivatives of both phenyl glycine and anthranilic acid, such as the ethanol amine salt of phenyl glycine and the ethanol amine salt of anthranilic acid.

The solvents or liquids with which the compounds comprising our invention may be used are in general represented by the formula $R(OH)_n$, in which R is either hydrogen or an alkyl radical and $n$ is a whole number equal to one or more. As illustrative of the class of compounds falling within this general formula are water, mono-hydric alcohols, such as ethyl alcohol, and polyhydric alcohols, such as glycerine and the various glycols. These hydroxyl-containing liquids may be employed singly or in mixtures of two or more, that is, the oxidation inhibitors may be used with aqueous solutions or aqueous alcohol solutions or aqueous glycerine solutions or aqueous alcohol glycerine solutions. Any of the components in these various solutions may be replaced by glycol. Where in the specification and claims we have used the word "alcohols" or "aqueous-alcohols" without further definition we wish to be understood as indicating any of the water soluble or water miscible alcohols normally employed in antifreeze solutions.

The amounts of oxidation inhibitor, of course, vary with the particular inhibitor employed as well as with the concentration of the solvent mixture. In general, sufficient inhibitor to comprise about one-half of 1% to 2% of the solution will be sufficient for most purposes. It will be understood, however, that we do not wish to be restricted to these limits which may be varied both below the lower limit and above the upper limit as occasion arises therefor. Of the amount of the inhibitor, the ratio of amino carboxylic acid derivative to the other substance, which for simplicity we shall call flotation agent, may also vary within wide limits.

Additional compounds known to be collecting agents in the flotation of metals, and which are effective for our purposes, are carbothialdine, diphenyl thio carbamate, ditolylthiourea, dixanthogen, lead xanthate, lead ethyl xanthate, potassium ethyl xanthate, sodium butyl xanthate, benzoyl ethyl xanthate, the various trithio carbonates and the metallic and alkyl derivatives, xanthic anhydride, dibutyl thiourea, dimethyl phenyl thiourea, phenyl iso thiocyanate, thialdine, thioaniline and thiophenol.

Other nitrogen containing bodies are azo naphthalene, benzo diazo amino p-toluene, benzyl diazo amino benzene, diazo amino benzene, naphtyl hydrazine, p-tolyl hydrazine, symmetrical diphenyl hydrazine, and xylidine.

The combination of an amino carboxylic acid derivative and a substance known to be a flotation agent may be added to an alcohol solution or to glycerine which is thereafter diluted to the proper concentration with water; or the mixture may be added directly to water and the alcohol, whether monohydric or polyhydric, thereafter added or even omitted if it is desired to use a pure aqueous solution. The mixture of substances which fall within the contemplation of our invention offer striking advantages in protecting copper and iron, particularly where the two metals are used in cooling systems for internal combustion engines, from corrosion. When added to the liquid employed in such a cooling system or to a liquid or mixture of liquids stored in tanks, drums or other metallic containers, there will be noticed a marked absence of corrosion and discoloration in the solution. Moreover, it is not necessary that our product be present in solutions of the liquids with which they are ultimately designed for use. We contemplate mixing one or more substances of the class of amino carboxylic acid derivatives and one or more substances of the class of substances which we have designated as flotation agents either in dry form or concentrated solutions for distribution to the trade. In such dry form or concentrated solutions or mixtures, the mixture of compounds falling within the contemplation of our invention may be added to water or water and alcohol solutions of any desired concentration, thereby forming in situ a solution of non-corrosive properties with respect to iron and copper.

As many apparently widely different embodiments of this invention may be made without departing from the spirit thereof, it is to be understood that we do not limit ourselves to the foregoing examples or descriptions except as indicated in the following patent claims:

We claim:

1. A composition of matter, suitable for use as a corrosion inhibitor for copper and iron when subjected to aqueous and aqueous alcohol solutions, which contains a soluble amino carboxylic acid derivative and an organic substance containing trivalent nitrogen and known to be a collecting agent in the froth flotation of metals.

2. A composition of matter, suitable for use as a corrosion inhibitor for copper and iron when subjected to aqueous and aqueous alcohol solutions, which contains a soluble amino carboxylic acid derivative and an organic substance containing trivalent nitrogen directly linked to carbon and known to be a collecting agent in the froth flotation of metals.

3. A composition of matter, suitable for use as a corrosion inhibitor for copper and iron when subjected to aqueous and aqueous alcohol solutions, which contains a soluble amino carboxylic acid derivative and an aromatic azo body known to be a collecting agent in the froth flotation of metals.

4. A composition of matter, suitable for use as a corrosion inhibitor for copper and iron when subjected to aqueous and aqueous alcohol solutions, which contains a soluble amino carboxylic acid derivative and an aromatic base known to be a collecting agent in the froth flotation of metals.

5. A composition of matter, suitable for use as a corrosion inhibitor for copper and iron when subjected to aqueous and aqueous alcohol solutions, which contains a soluble amino carboxylic acid derivative and an aromatic amine.

6. A composition of matter, suitable for use as a corrosion inhibitor for copper and iron when subjected to aqueous and aqueous alcohol solutions, which contains the sodium salt of phenyl glycine and an organic substance containing trivalent nitrogen and known to be a collecting agent in the froth flotation of metals.

7. A composition of matter, suitable for use as a corrosion inhibitor for copper and iron when subjected to aqueous and aqueous alcohol solutions, which contains the sodium salt of phenyl glycine and an organic substance containing trivalent nitrogen directly linked to carbon and known to be a collecting agent in the froth flotation of metals.

8. A composition of matter, suitable for use as a corrosion inhibitor for copper and iron when subjected to aqueous and aqueous alcohol solutions, which contains the sodium salt of phenyl glycine and an aromatic azo body known to be a collecting agent in the froth flotation of metals.

9. A composition of matter, suitable for use as a corrosion inhibitor for copper and iron when subjected to aqueous and aqueous alcohol solutions, which contains the sodium salt of phenyl glycine and an aromatic base known to be a collecting agent in the froth flotation of metals.

10. A composition of matter, suitable for use as a corrosion inhibitor for copper and iron when subjected to aqueous and aqueous alcohol solutions, which contains the sodium salt of phenyl glycine and an aromatic amine.

11. A solution of the water or water and alcohol type containing at least one liquid of the type $R(OH)_n$ in which R is a member of the group comprising hydrogen and alkyl radicals and $n$ is a whole number together with a soluble amino carboxylic acid derivative and an organic substance containing trivalent nitrogen and known to be a collecting agent in the froth flotation of metals.

12. A solution of the water or water and alcohol type containing at least one liquid of the type $R(OH)_n$ in which R is a member of the group comprising hydrogen and alkyl radicals and $n$ is a whole number together with a soluble amino carboxylic acid derivative and an organic substance containing trivalent nitrogen directly linked to carbon and known to be a collecting agent in the froth flotation of metals.

13. A solution of the water or water and alcohol type containing at least one liquid of the type $R(OH)_n$ in which R is a member of the group comprising hydrogen and alkyl radicals and $n$ is a whole number together with a soluble amino carboxylic acid derivative and an aromatic azo body known to be a collecting agent in the froth flotation of metals.

14. A solution of the water or water and alcohol type containing at least one liquid of the type $R(OH)_n$ in which R is a member of the group comprising hydrogen and alkyl radicals and $n$ is a whole number together with a soluble amino carboxylic acid derivative and an aromatic base known to be a collecting agent in the froth flotation of metals.

15. A solution of the water or water and alcohol type containing at least one liquid of the type $R(OH)_n$ in which R is a member of the group comprising hydrogen and alkyl radicals and $n$ is a whole number together with a soluble amino carboxylic acid derivative and an aromatic amine.

16. A solution of the water or water and alcohol type containing at least one liquid of the type $R(OH)_n$ in which R is a member of the group comprising hydrogen and alkyl radicals and $n$ is a whole number together with the sodium salt of phenyl glycine and an organic substance containing trivalent nitrogen and known to be a collecting agent in the froth flotation of metals.

17. A solution of the water or water and alcohol type containing at least one liquid of the type $R(OH)_n$ in which R is a member of the group comprising hydrogen and alkyl radicals and $n$ is a whole number together with the sodium salt of phenyl glycine and an organic substance containing trivalent nitrogen directly linked to carbon and known to be a collecting agent in the froth flotation of metals.

18. A solution of the water or water and alcohol type containing at least one liquid of the type $R(OH)_n$ in which R is a member of the group comprising hydrogen and alkyl radicals and $n$ is a whole number together with the sodium salt of phenyl glycine and an aromatic azo body known to be a collecting agent in the froth flotation of metals.

19. A solution of the water or water and alcohol type containing at least one liquid of the type $R(OH)_n$ in which R is a member of the group comprising hydrogen and alkyl radicals and $n$ is a whole number together with the sodium salt of phenyl glycine and an aromatic base known to be a collecting agent in the froth flotation of metals.

20. A solution of the water or water and alcohol type containing at least one liquid of the type $R(OH)_n$ in which R is a member of the group comprising hydrogen and alkyl radicals and $n$ is a whole number together with the sodium salt of phenyl glycine and an aromatic amine.

21. A composition of matter, suitable for use as a corrosion inhibitor for copper and iron when subjected to aqueous and aqueous-alcohol solutions, which contains a soluble amino carboxylic acid derivative and ortho-toluidine.

22. A composition of matter, suitable for use as a corrosion inhibitor for copper and iron when subjected to aqueous and aqueous-alcohol solutions, which contains a water soluble salt of phenyl glycine and orthotoluidine.

23. A composition of matter, suitable for use as a corrosion inhibitor for copper and iron when subjected to aqueous and aqueous-alcohol solutions, which contain an ethanolamine salt of phenyl glycine and orthotoluidine.

24. A composition of matter, suitable for use as a corrosion inhibitor for copper and iron when subjected to aqueous and aqueous-alcohol solutions, which contains an ethanolamine salt of phenyl glycine and an organic substance containing trivalent nitrogen and known to be a collecting agent in the froth flotation of metals.

25. A composition of matter, suitable for use as a corrosion inhibitor for copper and iron when subjected to aqueous and aqueous-alcohol solutions, which contains a sodium salt of phenyl glycine and orthotoluidine.

26. A composition of matter, suitable for use as a corrosion inhibitor for copper and iron when subjected to aqueous and aqueous-alcohol solutions, which contains a soluble amino carboxylic acid derivative and an organic substance containing trivalent nitrogen and known to be a collecting agent in the froth flotation of metals, said substance being a member of the group consisting of azo benzene, amino azo toluene, amino azo toluene azo naphthol, benzidine, phenyl hydrazine, orthotoluidine, triphenyl guanidine, quinoline, pyridene, azoxy benzene, alpha-naphthathylamine, azo naphthalene, benzo diazo amino p-toluene, benzyl diazo amino benzene, diazo amino benzene, naphthyl hydrazine, p-tolyl hydrazine, symmetrical diphenyl hydrazine, and xylidine.

27. A composition of matter, suitable for use as a corrosion inhibitor for copper and iron when subjected to aqueous and aqueous-alcohol solutions, which contains a water soluble salt of phenyl glycine and an organic substance containing trivalent nitrogen and known to be a collecting agent in the froth flotation of metals, said substance being a member of the group consisting of azo benzene, amino azo toluene, amino azo toluene azo naphthol, benzidine, phenyl hydrazine, orthotoluidine, triphenyl guanidine, quinoline, pyridene, azoxy benzene, alpha-naphthylamine, azo naphthalene, benzo diazo amino p-toluene, benzyl diazo amino benzene, diazo amino benzene, naphthyl hydrazine, p-tolyl hydrazine, symmetrical diphenyl hydrazine, and xylidine.

28. The process of inhibiting the corrosion of an oxidizable metal upon contact with an aqueous or aqueous-alcohol solution which comprises contacting said solution with the oxidizable metal in the presence of a soluble amino carboxylic acid derivative and an organic substance containing trivalent nitrogen and known to be a collecting agent in the froth flotation of metals.

29. The process of inhibiting the corrosion of an oxidizable metal upon contact with an aqueous or aqueous-alcohol solution which comprises contacting said solution with the oxidizable metal in the presence of a soluble amino carboxylic acid derivative and an aromatic base known to be a collecting agent in the froth flotation of metals.

30. The process of inhibiting the corrosion of an oxidizable metal upon contact with an aqueous or aqueous-alcohol solution which comprises contacting said solution with the oxidizable metal in the presence of a soluble amino carboxylic acid derivative and an aromatic amine.

31. The process of inhibiting the corrosion of an oxidizable metal upon contact with an aqueous or aqueous-alcohol solution which comprises contacting said solution with the oxidizable metal in the presence of a water soluble salt of phenyl glycine and an organic substance containing trivalent nitrogen and known to be a collecting agent in the froth flotation of metals.

32. The process of inhibiting the corrosion of an oxidizable metal upon contact with an aqueous or aqueous-alcohol solution which comprises contacting said solution with the oxidizable metal in the presence of an ethanolamine salt of phenyl glycine and an organic substance containing trivalent nitrogen and known to be a collecting agent in the froth flotation of metals.

33. The process of inhibiting the corrosion of an oxidizable metal upon contact with an aqueous or aqueous-alcohol solution which comprises contacting said solution with the oxidizable metal in the presence of the sodium salt of phenyl glycine and an organic substance containing trivalent nitrogen and known to be a collecting agent in the froth flotation of metals.

34. The process of inhibiting the corrosion of an oxidizable metal upon contact with an aqueous or aqueous-alcohol solution which comprises contacting said solution with the oxidizable metal in the presence of a soluble amino carboxylic acid derivative and orthotoluidine.

35. The process of inhibiting the corrosion of an oxidizable metal upon contact with an aqueous or aqueous-alcohol solution which comprises contacting said solution with the oxidizable metal in the presence of a water soluble salt of phenyl glycine and orthotoluidine.

36. The process of inhibiting the corrosion of an oxidizable metal upon contact with an aqueous or aqueous-alcohol solution which comprises contacting said solution with the oxidizable metal in the presence of a soluble amino carboxylic acid derivative and an organic substance containing trivalent nitrogen and known to be a collecting agent in the froth flotation of metals, said substance being a member of the group consisting of azo benzene, amino azo toluene, amino azo toluene azo naphthol, benzidine, phenyl hydrazine, orthotoluidine, triphenyl guanidine, quinoline, pyridene, azoxyl benzene, alpha-naphthylamine, azo naphthalene, benzo diazo amino p-toluene, benzyl diazo amino benzene, diazo amino benzene, naphthyl hydrazine, p-tolyl hydrazine, symmetrical diphenyl hydrazine, and xylidine.

37. The process of inhibiting the corrosion of an oxidizable metal upon contact with an aqueous or aqueous-alcohol solution which comprises contacting said solution with the oxidizable metal in the presence of a water soluble salt of phenyl glycine and an organic substance containing trivalent nitrogen and known to be a collecting agent in the froth flotation of metals, said substance being a member of the group consisting of azo benzene, amino azo toluene, amino azo toluene azo naphthol, benzidine, phenyl hydrazine, orthotoluidine, triphenyl guanidine, quinoline, pyridene, azoxy benzene, alpha-naphthylamine, azo naphthalene, benzo diazo amino p-toluene, benzyl diazo amino benzene, diazo amino benzene, naphthyl hydrazine, p-tolyl hydrazine, symmetrical diphenyl hydrazine, and xylidine.

In testimony whereof we affix our signatures.

WILLIAM S. CALCOTT.
HERBERT W. WALKER.